United States Patent [19]

Spertus et al.

[11] Patent Number: 6,055,612

[45] Date of Patent: Apr. 25, 2000

[54] INCREMENTAL GARBAGE COLLECTOR WITH DECOMMIT BARRIER

[75] Inventors: Michael Spertus, Chicago, Ill.; Gustavo Rodriguez-Rivera, West Lafayette, Ind.; Charles Fitterman, Deerfield, Ill.

[73] Assignee: Geodesic Systems, Inc., Chicago, Ill.

[21] Appl. No.: 08/891,687

[22] Filed: Jul. 11, 1997

[51] Int. Cl.[7] .................................................. G06F 17/30
[52] U.S. Cl. ........................ 711/165; 711/160; 711/159; 707/205; 707/206
[58] Field of Search .................................. 707/205, 206, 707/154; 711/159, 160, 165, 170

[56] References Cited

U.S. PATENT DOCUMENTS

| | | | |
|---|---|---|---|
| 4,775,932 | 10/1988 | Oxley et al. | 707/206 |
| 4,797,810 | 1/1989 | McEntee et al. | 707/206 |
| 5,485,613 | 1/1996 | Engelstad et al. | 707/206 |
| 5,652,883 | 7/1997 | Adcock | 707/206 |
| 5,873,105 | 2/1999 | Tremblay et al. | 707/206 |

OTHER PUBLICATIONS

A paper by Paul R. Wilson "Uniprocessor Garbage Collection Techniques", in 1992 International Workshop on Memory Management (St. Malo, France, Sep., 1992) published in the Springer–Verlag Lecture Notes in Computer Science.

Advantages and Disadvantages of Conservative Garbage Collection (could be found in the internet at: ftp://parcftp.xerox.com/pub/gc/issues.html) on Feb. 20, 1997.

Geodesic—Great Circle White Papers (could be found in the internet at http://www.geodesic.co . . . circle/whitepaper.html) on Feb. 20, 1997.

*Primary Examiner*—Eddie P. Chan
*Assistant Examiner*—Than Nguyen
*Attorney, Agent, or Firm*—Gordan E. Nelson

[57] ABSTRACT

An incremental garbage collector which permits a memory allocator's decommit mechanism to operate while the garbage collector is detecting memory that a program being executed is certainly not using. The garbage collector includes a decommit barrier which prevents the garbage collector from referencing memory that the allocator has decommitted from the address space of the process on which the program is executing. In mark-sweep incremental garbage collectors, the decommit barrier may be implemented in two ways: by means of a table which the allocator marks whenever it determines that a portion of memory is subject to being decommitted from the process's address space and which the garbage collector examines before scanning the portion and by means of a table which the garbage collector marks when it finds that a portion of memory must be scanned and which the allocator examines before decommitting the portion. The decommit barrier may further be implemented as a response to the fault that occurs when the garbage collector attempts to reference a portion of memory that has been decommitted.

20 Claims, 3 Drawing Sheets

INCREMENTAL GARBAGE COLLECTOR WITH DECOMMIT BARRIER

BACKGROUND OF THE INVENTION

1. Field of the Invention

The invention relates generally to the reclamation of storage during execution of a process and more specifically to incremental garbage collectors.

2. Description of the Prior Art

Popular programming languages such as C or C++ permit programmers to explicitly allocation and free portions of memory during execution of the program. While the ability to allocate and free memory greatly simplifies many programming tasks, it does present one difficulty: the programmer must carefully coordinate allocating and freeing memory. Once the memory has been allocated, it must not be freed until the program is in fact done using it; once the program is in fact finished using the memory, it must be freed, otherwise, it will remain unavailable for reuse by the program or by other programs.

The difficulty of avoiding errors in freeing data increases as the size of a program grows. Memory is often allocated in one module of the program, used in other modules of the program, and freed in still other modules. These modules are often written by different programmers and are executed in different orders. The difficulty also increases as a program ages. Most programs are modified to fix bugs or add new features, and the people who do the modifications are generally different from those who write the original program. The manner in which the modified program employs blocks of memory or allocates or frees them may be different from that contemplated by the original authors of the program.

The consequences of mistakes in freeing allocated memory have further become more serious as more and more programs "run forever", that is, they are continually executed in computers that are never shut down. A program which does not free all of the memory it allocates will appear to operate correctly when executed intermittently; however, when it runs forever, it will run out of memory and fail. Such failures are particularly problematical, first, because the very fact that the program runs forever means that other programs are relying on it. When it fails, they often cannot continue. Second, when such failures happen depends on the total condition of the system in which the program is executing; that makes the failures difficult to anticipate, difficult to understand and correct, and difficult to recover from. Finally, even before a program that is not freeing memory correctly fails, the memory resources it fails to free remain unavailable for use by other programs, and consequently, the entire computer system operates less efficiently than it would otherwise.

One way of solving the problems posed by programs which free their own memory is to reserve all freeing of memory to a special program called a garbage collector, so called because it collects garbage memory, that is, blocks of memory that are no longer being used by a program, and reclaims them for later reuse. FIG. 1 shows how the memory 101 used by a computer program when it is being executed looks to a garbage collector. The program executes on an entity called a process. Each process has its own process address space 103 and the program executing on the process can only reference data in the process's address space 103. For purposes of the present discussion, process address space 103 is subdivided into two parts: committed address space 131, which is that part of process address space 103 which has been mapped to the physical devices that make up the memory in the computer system that the process is executing on, and uncommitted address space 132, which has not been so mapped. Before a program can actually read data from or write data to a location in process address space 103, that location must be part of committed address space 131.

Committed address space 131 further includes automatically-allocated memory 107, heap 109, and free memory 114. Not shown here, but also contained in committed address space 131 is the code executed by the program. Automatically-allocated memory 107 is memory that the program automatically allocates as it initializes itself and executes calls and returns from procedures. The automatically allocated storage is shown at 107. It typically includes data 121 that is in the computer's hardware registers when the program's process is actually running on the computer, static data 123, that is, data that remains available for the entire execution of the program, and stack 125, which has a frame 127 for each procedure that the program has called and not yet returned from, with the frame for the most recently-called procedure being at the top of the stack. Just as the program automatically allocates storage 107, it automatically deallocates it; when the program returns from a call to a procedure, the frame for the procedure is removed from the stack; similarly, the storage for the static data and the hardware registers is automatically deallocated when the program ceases execution.

When an allocation function in a program allocates storage, the allocated storage makes up an area called the heap 109, because the storage in this area is not ordered like the data in the stack. Storage in the heap comes from free memory 114. When a portion 104 of free memory 114 is allocated, the allocation function returns a pointer 108 to the portion 104 that was allocated to the program which executed the allocation function. The pointer is simply a data item which contains the location in the memory system of the portion 104. The program stores the pointer to the newly-allocated portion in previously-allocated memory, either in the automatically allocated memory 107 or in heap 109. The program can only use the newly-allocated portion 104 as long as it has a pointer to it. When the program no longer has a pointer to the portion 104, the portion 104 has become garbage, as shown at 111. The allocation function allocates portions 104 from free memory 114. Whenever a program is done with a portion 104, it should return it to free memory 114.

Efficient use of the physical memory resources of the computer system that the process to which process address space 103 is executing on requires that committed address space 131 not be too much larger than the actual current physical memory requirements of the process.

For this reason, allocation and freeing of memory should be accompanied by adjustments in the size of committed address space 131. The component of the computer system that handles automatic allocation and deallocation and allocation and freeing by means of allocation and free functions and manages committed address space 131 is termed herein the allocator. Once the allocator has decommitted a portion of committed address space 131, that is, terminated the mapping between that portion of process address space 103 and a portion of physical memory, any reference by a program being executed by the process to which address space 103 belongs to the decommitted portion of its address space will result in a segmentation or protection fault. In the case of free address space 114, commitment and decommitment are done by mapping free blocks 113 into free memory 114 and unmapping free blocks 113 from free memory 114. To manage free blocks 113, the allocator uses free list 129.

As would be expected from FIG. 1, garbage collectors work by detecting memory portions 104 that no longer have pointers 108 pointing to them and returning such "garbage" portions 111 to free memory 114. There are a number of different techniques for doing garbage collection; the paper by Paul R. Wilson, "Uniprocessor Garbage Collection Techniques", in 1992 *International Workshop on Memory Management* (St. Malo, France, September, 1992), published in the Springer-Verlag *Lecture Notes in Computer Science* series, provides an overview. One popular technique is termed mark-sweep collection. In mark-sweep collection, the garbage collector starts at a root consisting of all of the storage for the execution of the program that was not allocated by the allocation function (typically, the hardware registers and automatically-allocated memory 107 in FIG. 1) and follows the pointers 108 to portions 104. Whenever it finds a new portion 104, it marks the portion as being in use by the execution of the program to which automatically-allocated storage 107 belongs. The marking may be done in the portion 104 itself or in a table which keeps track of the status of the portions 104. Then it looks for pointers 108 in the newly-marked portion and follows each pointer that points to a previously-unmarked portion. That portion is then marked and examined as just described. Once all of the portions 104 that are reachable from automatically-allocated storage 107 have been marked, the garbage collector scans process address space 103 to determine which portions 104 have not been marked. Those that are not marked are garbage and the garbage collector returns them to free memory 114.

The simplest way to do garbage collection is by halting the process that automatically allocated storage 107 belongs to, doing all of the marking, scanning, and returning of portions at once, and then restarting the process. The disadvantage with this approach is that the process is not available to other processes while the garbage collection is going on. To solve this problem, incremental garbage collectors have been developed in which the marking operation is done in increments, with the increments being interleaved with the execution of the program. Once the marking has been done in this fashion, the scanning and collection operations are done, so that there are only short interruptions in the execution of the process. One set of marking, scanning, and collection operations is termed a garbage collection cycle.

An incremental garbage collector must be able to cope with the problem that the memory portions used by the program being executed change behind the garbage collector's back, that is, that the program has not stopped executing, and consequently may either change the value of a pointer in a portion that has already been marked or invoke a free function and thereby cause a portion to be decommitted that has been marked but whose pointers have not yet been followed. If the value of a pointer is changed to point to a portion that previously had no pointer to it, the garbage collector will not scan the portion and may erroneously treat the portion as garbage and return it to free memory 114; at the same time, the portion previously pointed to by the pointer has been marked and will not be returned to free memory 114. The same will be true of other portions pointed to only by pointers in that portion. The first error is more serious than the second, since in the second case, the next garbage collection cycle will detect that the portion that has been erroneously marked is garbage and will return it to free memory 114. If a portion has been decommitted, an attempt by the garbage collector to follow a pointer to the portion will result in a segmentation or protection fault.

To deal with the fact that pointers in the memory portions can change behind the garbage collector's back, the designers of incremental garbage collectors employ read barriers or write barriers to detect changes in the values of pointers and to keep track of those changes which will affect garbage collection. The new pointers are then followed and the portions they point to are marked if they have not been. For a discussion of read and write barriers, see page 18 of the Wilson reference supra.

Dealing with portions that are decommitted because a program has invoked a free function is more difficult. Currently, three solutions are known:

Prohibiting the use of explicit deallocation by programs for which the garbage collector is collecting garbage; languages such as Java or Small Talk that include provisions for automatic garbage collection take this approach.

Not decommitting memory at all until a process terminates. This is the approach generally used in operating systems of the UNIX® type.

Decommitting memory portions only once during a garbage collection cycle. This is done by copying garbage collectors and snapshot garbage collectors such as the one implemented by Gustavo Rodriguez-Rivera and Vince Russo at Purdue University.

All three solutions have disadvantages. The disadvantage of the first solution is that prohibiting the use of explicit deallocation prevents garbage collectors from being used with two important classes of programs: those where considerations of time or space efficiency require that the programmer specify the allocation and free operations and more importantly, legacy programs which were not written for garbage collectors. Legacy programs are old programs which still work and can be upgraded or reimplemented only at great expense. The programs thus typically end up being executed in environments which have little or no resemblance to the environments they were written for. The fail-safe use and maintenance of such "legacy" programs is one of the most pressing problems of computer science, and because many incremental garbage collectors do not operate properly with legacy programs, they cannot be used to help solve the legacy program problem. The disadvantage with the second solution is that the process keeps the largest amount of memory committed to it during its execution until it terminates. Where there are large variations in the amount of memory required by a process during execution, this results in inefficient use of memory resources.

There are three disadvantages with the third solution. One disadvantage is that memory can be decommitted only once in a garbage collection cycle. That in turn requires the allocator to maintain a larger committed address space 131 than would be necessary if it could decommit memory more frequently, resulting in a less efficient use of the computer system's physical memory resources. Another is that memory is not available to another process until the next garbage collection cycle. The third is that restricting the decommitting of memory to once a cycle increases the length of time required for that part of the cycle and thereby conflicts with an important design goal of incremental garbage collectors, namely designing the cycle such that each stage of it is either short or may be subdivided into a sequence of short operations. These disadvantages increase as the length of the garbage collection cycle increases. Where garbage collection is used as a backup memory recovery mechanism with programs that allocate and free memory using the allocation and free functions, a single cycle may last for many hours.

What is needed is an incremental garbage collector which permits decommittal of memory by the allocator and consequently can be used with programs that explicitly free storage but has a garbage collection cycle that is as efficient as those of garbage collectors that cannot be used with such programs. It is an object of the invention to provide such an incremental garbage collector.

SUMMARY OF THE INVENTION

The object of the invention is attained by modifying the incremental garbage collector so that the allocator can decommit the memory during the operation of that part of the garbage collection system which detects memory that is certainly not being used by the process.

In one aspect of the invention, the modification is a decommit barrier which prevents a reference by the portion of the garbage collector that detects portions of memory which are certainly not being used by an application program to a portion of memory that has been decommitted from the address space by the allocator. The decommit barrier includes information which indicates a status of a portion of memory with regard to being decommitted, and the information is used to coordinate operation of the allocator and the incremental garbage collection.

The information may take a number of forms. One form is indications for portions of memory for which it is not certain that they are not being used by the program. The allocator checks the indications before it decommits a portion of memory and does not decommit the portion if the indications indicate that it is not certain that they are not being used. Another form for the information is indications for portions of memory which are being decommitted. The portion of the garbage collector that detects portions of memory which are certainly not being used checks these indications before making a reference to a portion of memory. The information may be in a table accessible to both the garbage collector and the allocator or it may be included in the memory blocks themselves. It may also be obtained as a result of a fault that occurs when the garbage collector attempts to reference a decommitted block.

Where the garbage collector is of the type that uses mark-sweep garbage collection techniques, the information may indicate whether the portion of memory has been marked by the garbage collector or whether it is subject to being decommitted; in the former case, the allocator checks the information before decommitting the portion of memory; in the latter case, the garbage collector checks the information before following a pointer to the portion of memory.

Other objects and advantages of the invention will be apparent to those skilled in the arts to which the invention pertains upon perusing the following Detailed Description and Drawing, wherein:

Figure 1:
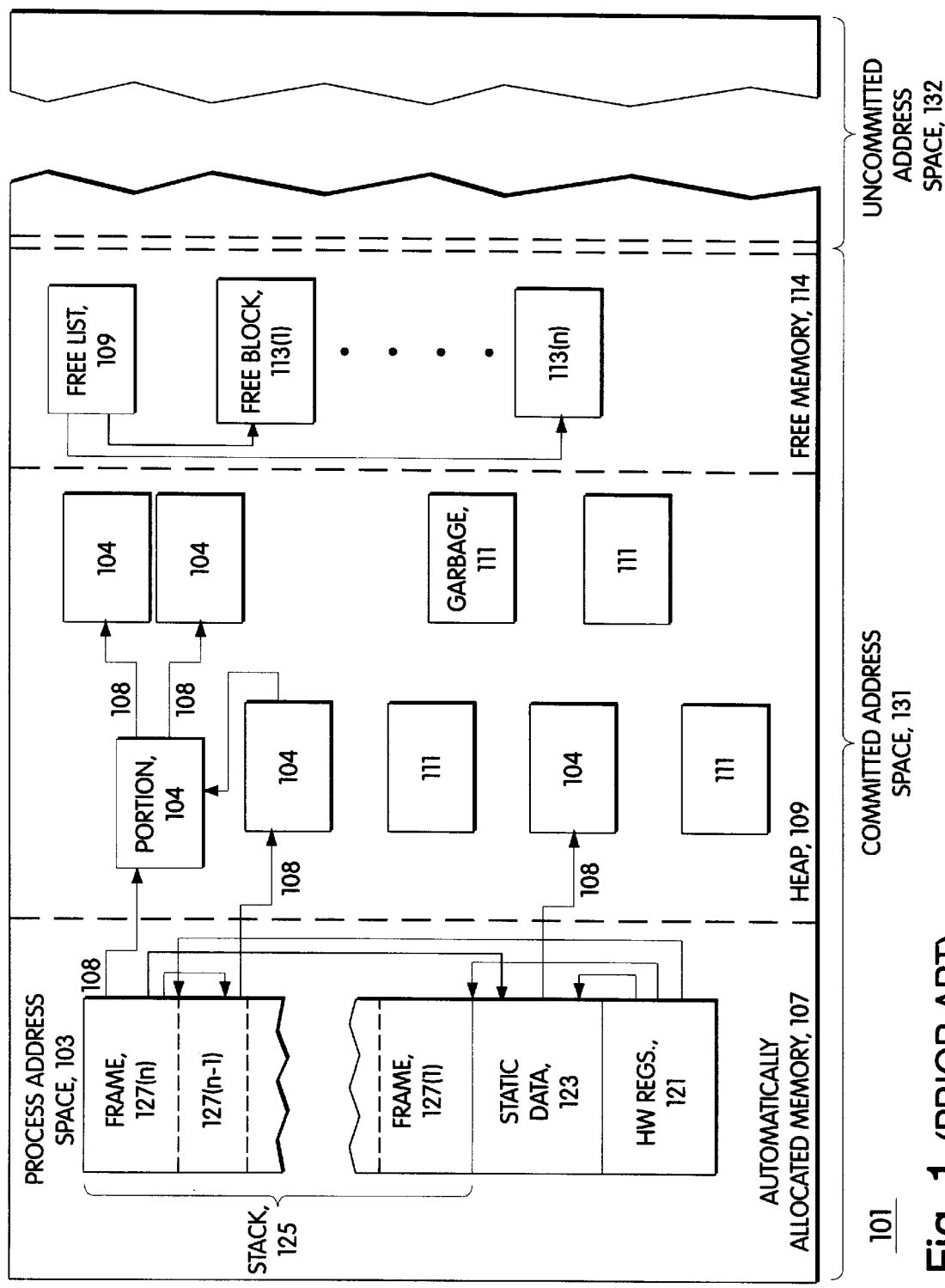
FIG. 1 is a diagram showing the structure of the memory used by a computer program while it is being executed.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The techniques used herein to make it possible to decommit memory during operation of that part of the garbage collector which detects storage that the program is not using will be termed generically a decommit barrier. What is required to build the decommit barrier is cooperation between the allocator and the garbage collector. Either the garbage collector must know that a portion of memory that it is going to examine has been decommitted by the allocator or the allocator must know that the portion it is going to decommit includes one or more portions that have been marked by the garbage collector. In the following, a first implementation which uses the one alternative and a second implementation which uses the other alternative will be described.

Figure 2:
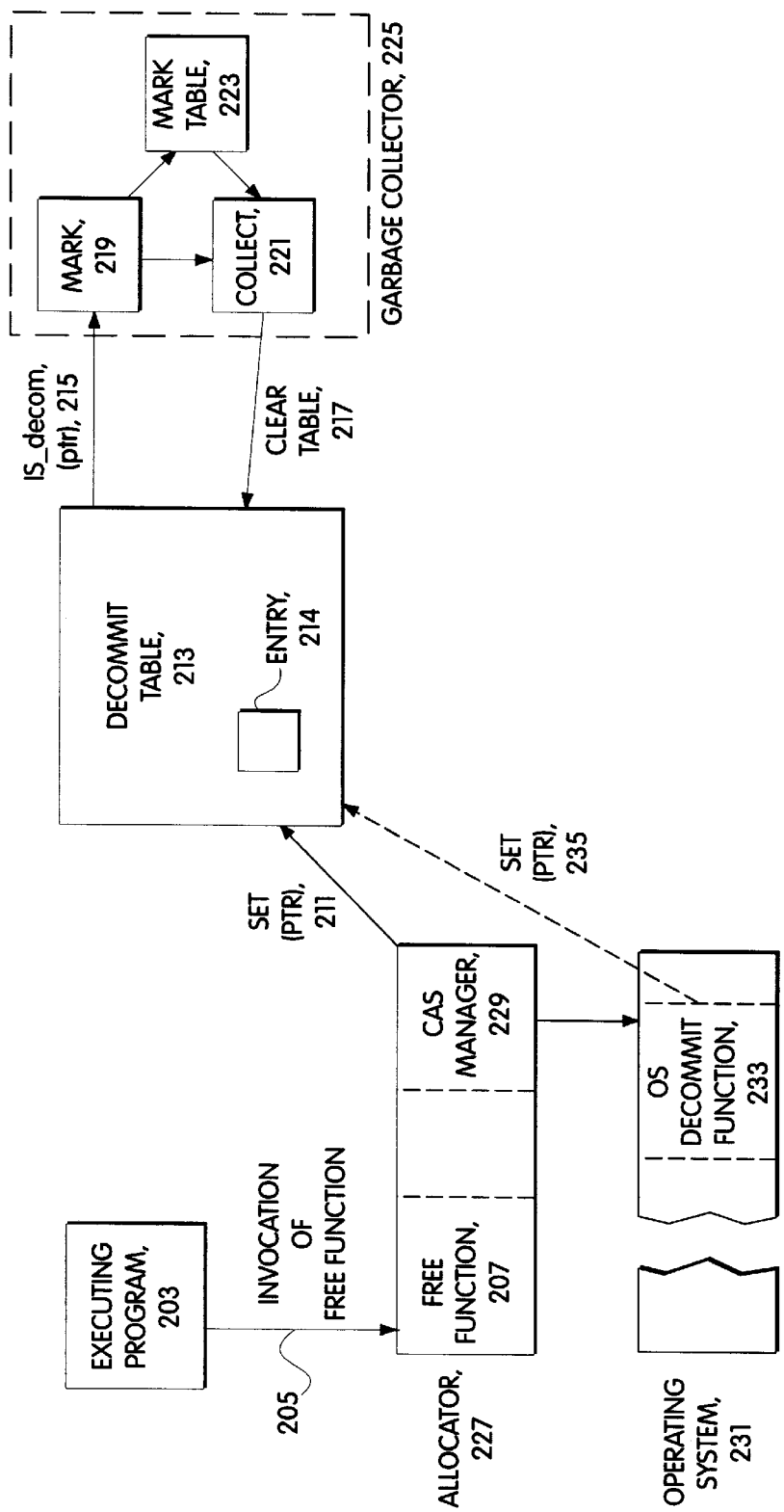
FIG. 2 is a diagram showing a first embodiment of a garbage collector with a decommit barrier.

Garbage Collector Which Does Not Scan Portions That Have Been Decommitted: FIG. 2

FIG. 2 is a block diagram of an implementation 201 of the decommit barrier in which the garbage collector does not scan portions that have been decommitted by the allocator. Shown in FIG. 2 are executing program 203, free function 207, allocator 227, parts of operating system 231, and incremental garbage collector 225, together with decommit table 213, which is accessible to both allocator 227 and garbage collector 205. The portions of allocator 227 that are relevant to the present discussion are free function 207 and committed address space manager 229, which manages the size of committed address space 131. Program 203 was not written to be used with garbage collector 225 and consequently invokes free function 207 to return a portion of memory 104 to free memory 114. The return of portion of memory 104 to free memory 114 may in turn result in CAS manager 229 determining that a block 113 may be decommitted. When CAS manager 229 does so, it invokes OS decommit function 233 to decommit block 113, as shown at 235. It also sets an entry 214 for block 113 in decommit table 213. The entry indicates at a minimum that block 113 has been decommitted. The entry may be of any size, including a single bit. The entry is accessible by means of any pointer which points to a location in the portion of the process's address space that was mapped to block 113. As shown at 211, the entry may be set by a set(ptr) function which takes as an argument the pointer given to operating system 231 by CAS manager 229 to indicate which block 113 is to be decommitted. As indicated by dashed arrow 205, in another embodiment, OS decommit function 223 could set entry 214 instead of CAS manager 229.

While program 203 is executing, garbage collector 225 periodically collects garbage. Garbage collector 225 has three main components, marker 219, collector 221, and mark table 223. Marker 219 marks portions 104 that are being used by program 203 in mark table 223 and collector 221 reads mark table 223 to determine which portions 104 are not being used by program 203 and then returns those portions 104 to free memory 114. Mark table 223 has an entry for every portion 104 which is available to be allocated to program 203. Like decommit table 213, entries in mark table 223 may be accessed by pointers 108 to the portions 104 represented by the entries. Marker 219 examines the memory being used by program 203 in the manner described above, and when it finds a portion 104 that is being used by program 203, it marks the entry for the portion 104 in mark table 223.

As set forth above, if marker 219 attempts to examine a portion 104 which was returned by free function 207 to free memory 114 and that belonged to a block 113 that was then decommitted, a segmentation fault or protection fault will occur. To prevent this, marker 219 always checks decommit table 213 before it follows a pointer to a portion 104. If the entry accessed by the pointer to portion 104 indicates that the portion has been decommitted, marker 219 does not follow the pointer. To check decommit table 213, marker 219 employs a function like that shown at 215 as is__decomm(ptr), that is, the function takes a pointer 108 as an argument and returns true if the entry in decommit table 213 accessed by the pointer has been set and false if it has not been. Since marker 219 does not follow the pointer, no segmentation fault or protection fault occurs. Of course, since the free function has or will return the freed portion 104 to free memory 114, garbage collector 225 need not concern itself with that portion 104. After collector 221 has examined mark table 223 to find the garbage blocks 111 and has returned them to free memory 114, it uses a function like the clear__table() function shown at 217 to clear all of the entries in decommit table 213.

Figure 3:
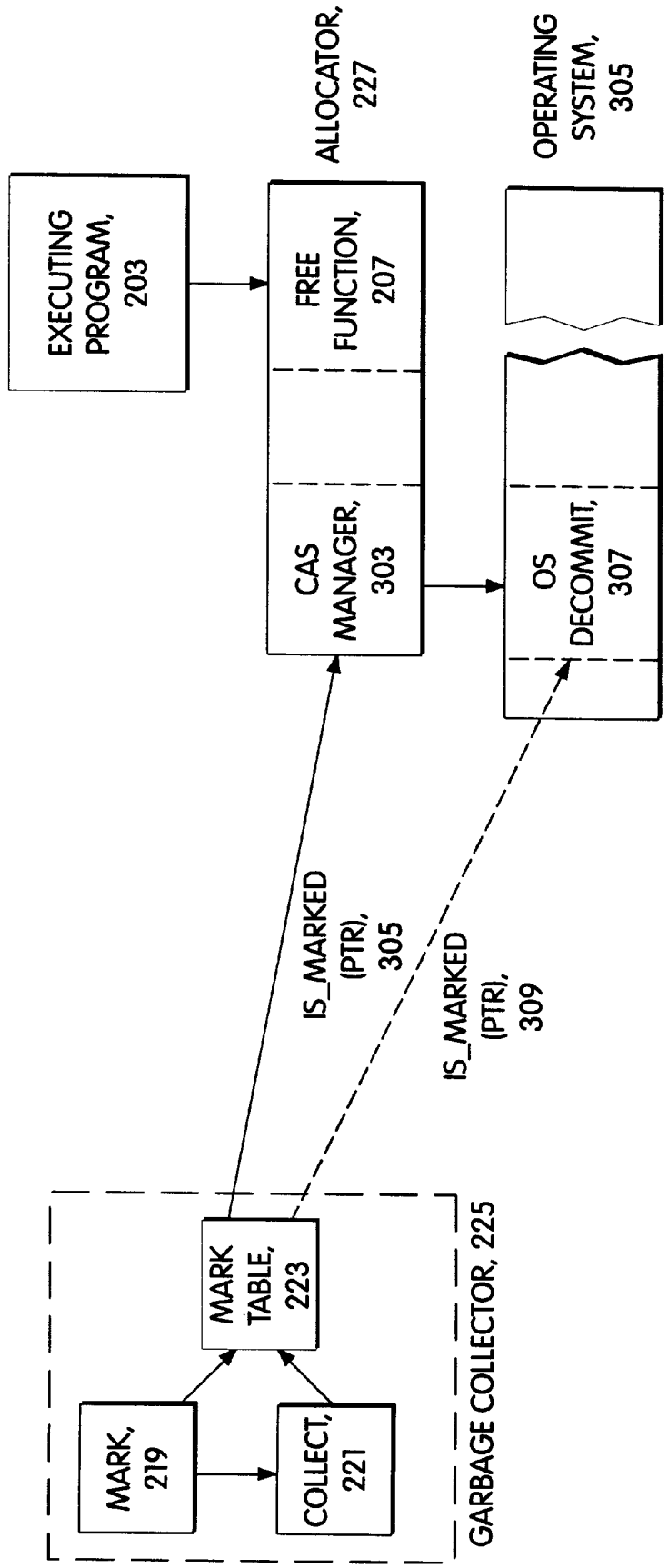
FIG. 3 is a diagram showing a second embodiment of a garbage collector with a decommit barrier.

Allocator Which Does Not Free Portions That Have Been Marked: FIG. 3

In a second implementation, allocator 227 looks at mark table 223 before it decommits a block 113 and does not decommit a block 113 containing portions 104 whose entry in mark table 223 has been set, thereby preventing protection or segmentation faults when marker 219 attempts to follow pointers. In this implementation, shown at 301 in FIG. 3, the components of garbage collector 225 are identical to those in implementation 201. There is no decommit table 213 and CAS manager 303 has been modified so that it reads mark table 223 before it decommits a block 113. The reading is done with a function like is__marked(ptr), shown at 305. The function takes the pointer to the block 113 being decommitted as an argument and uses the pointer to locate an entry in mark table 223; if the entry indicates that a portion 104 contained in the block 113 has been marked, is__marked(ptr) returns true; otherwise it returns false. In the former case, CAS manager 303 does not decommit the block 113; in the latter, it does. Again, as shown by dashed arrow 309, OS decommit function 307 could read mark table 223 instead of CAS manager 303.

Other Embodiments

The two embodiments just described use tables shared by the garbage collector and the allocator to coordinate the operation of the two. Since the blocks that are decommitted are a subset of the portions that are freed by free function 207, other implementations may have free function 207 mark decommit table 213 or read mark table 223. It would also be possible to implement the decommit barrier by marking the portions themselves instead of marking decommit table 213 or mark table 219. In such an embodiment, mark component 219 would simply place a mark in each portion 104 it encountered while marking and CAS manager 229 would not decommit a block 113 that contained a portion marked by mark component 219 until the end of the garbage collection cycle. Similarly, free function 207 could merely place a mark in each portion that was freed by invoking it and CAS manager 229 would not decommit a block 113 containing such a portion until the end of the cycle. Finally, an embodiment could be made which neither maintained tables nor marked portions 104. In such an embodiment, garbage collector 225 would include a fault handler for the protection or segmentation faults produced by attempting to reference decommitted portions 104 and the fault handler would permit garbage collector 225 to continue operating after attempting the reference. One simple way to do this would be to have the fault handler simply replace the pointer which caused the fault with the next pointer in the portion 104 being examined.

Conclusion

The foregoing Detailed Description has disclosed to those skilled in the art to which the invention pertains how to make and use an incremental garbage collector which has been modified so that the allocator can decommit memory from a process during operation of the portion of the garbage collector which detects memory that is not being used by the program being executed on the process. The Detailed Description has further disclosed the best mode presently known to the inventors for implementing the invention and other modes as well. Moreover, as will be immediately apparent to those skilled in the art to which the invention pertains, implementations of incremental garbage collectors which embody the principles disclosed herein may differ in detail as required by the environments for which they are implemented and as determined by the design choices of those implementing the garbage collectors.

For the foregoing reasons, the detailed description is to be regarded as being in every respect illustrative and not restrictive and the scope of the invention is to be determined solely with reference to the claims as interpreted with the full breadth permitted by the patent laws.

What is claimed is:

1. An improved incremental garbage collector including
a detector which detects portions of memory for which it is certain that the portions are not being used by an application program and
a collector which recovers portions of memory detected by the detector for reuse, the incremental garbage collector being used in a system that has an allocator for managing commitment and decommitment of memory to an address space, the improvement comprising:
apparatus for coordinating operation of the detector and the allocator such that the allocator is able to decommit memory from the address space during operation of the detector without affecting the detector's operation,
whereby the incremental garbage collector may be used with an application program that explicitly deallocates portions of memory.

2. The improved incremental garbage collector set forth in claim 1 wherein:
the apparatus for coordinating operation of the detector and allocator is a decommit barrier for preventing a reference by the detector to a portion of memory that has been decommitted from the address space by the allocator during operation of the detector.

3. The incremental garbage collector set forth in claim 2 wherein the decommit barrier comprises:
information that indicates a status of a given portion of memory with regard to being decommitted; and
the incremental garbage collector and the allocator use the information to coordinate operation of the detector and decommitting of memory by the allocator.

4. The incremental garbage collector set forth in claim 3 wherein:
the detector sets indications for portions of memory for which it is not certain that the portions are not presently being used by the application program;

the information for the given portion is the indication set by the detector for the given portion; and the allocator does not decommit the given portion when the indication for the given portion is set.

5. The incremental garbage collector set forth in claim 3 wherein:

the allocator sets indications for portions of memory that have been decommitted;

the information for the given portion is the indication set by the allocator for the given portion; and the detector does not make a reference to the given portion when the indication for the given portion is set.

6. The incremental garbage collector set forth in either of claims 4 or 5 further comprising:

a table that contains the information and is accessible to both the allocator and the detector.

7. The incremental garbage collector set forth in either of claims 4 or 5 wherein:

the given portion of memory contains the information.

8. The incremental garbage collector set forth in claim 3 wherein:

the information is produced by a fault that occurs when the detector attempts to reference a decommitted portion.

9. The incremental garbage collector set forth in claim 3 wherein:

the information is an indication for the given portion that indicates that the given portion is subject to being decommitted;

the detector includes a marking component which follows pointers to traverse portions being used by the application program; and the marking component checks the indication before following a pointer and follows the pointer only if the indication does not indicate that the given portion is subject to being decommitted.

10. The incremental garbage collector set forth in claim 3 wherein:

the detector includes a marking component that marks portions that are being used by the application program with indications thereof;

the information is the indications made by the marking component; and the allocator decommits the given portion only if there is no indication for the given portion.

11. The incremental garbage collector set forth in either of claims 9 or 10 further comprising:

a table that contains the information and is accessible to both the allocator and the detector.

12. The incremental garbage collector set forth in either of claims 9 or 10 wherein:

the given portion of memory contains the information.

13. A memory device, the memory device being characterized in that:

the memory device contains code which, when executed in a processor concurrently with code for an allocator that manages commitment and decommitment of memory to an address space, performs the steps of:

incrementally detecting portions of memory for which it is certain that the portions are not being used by an application program;

incrementally collecting the detected portions of memory for reuse and recovering portions of memory detected for reuse; and coordinating operation of the allocator and the step of detecting portions of memory such that the allocator is able to decommit memory from the address space during the operation of the step of detecting without affecting performance of the step of detecting portions of memory.

14. The memory device set forth in claim 13 further characterized in that:

the step of coordinating operation of the allocator and performance of the step of detecting portions of memory prevents reference during performance of the step of detecting to a portion of memory that has been decommitted from the address space.

15. The memory device set forth in claim 14 further characterized in that the step of coordinating operation of the allocator and performance of the step of detecting includes the step of:

maintaining information that indicates a status of a given portion of memory with regard to being decommitted, the information being used to coordinate operation of the allocator and performance of the step of detecting portions of memory.

16. The memory device set forth in claim 15 further characterized in that:

the step of detecting includes the step of setting indications in the information for portions of memory for which it is not certain that the portions are not presently being used by the application program; and the allocator does not decommit the given portion when the indication is set.

17. The memory device set forth in claim 15 further characterized in that:

the allocator sets indications in the information for portions of memory that have been decommitted; and the step of detecting includes the step of not making a reference to the given portion when the indication for the given portion is set.

18. The memory device set forth in claim 15 further characterized in that the code further performs the step of:

responding to a fault that occurs when the step of detecting attempts to reference a decommitted portion of memory by setting an indication in the information for the decommitted portion.

19. The memory device set forth in claim 15 further characterized in that:

the step of detecting includes the step of following pointers to traverse portions of memory being used by the application program, the step of following a pointer to a given portion being performed only if the information for the given portion does not indicate that the given portion is subject to being decommitted.

20. The memory device set forth in claim 15 further characterized in that:

the step of detecting includes the step of setting indications in the information for portions of memory that are being used by the application; and the allocator decommits the given portion only if the indication for the given portion of memory indicates that the given portion is not being used by the application.

* * * * *

UNITED STATES PATENT AND TRADEMARK OFFICE
CERTIFICATE OF CORRECTION

PATENT NO. : 6,055,612
DATED : April 25, 2000
INVENTOR(S) : Michael Spertus, Gustavo Rodriguez-Rivera and Charles Fiterman It is certified that error appears in the above-identified patent and that said Letters Patent is hereby corrected as shown below:

<u>Title page,</u>
Item [75], Inventors, "Charles Fitterman" should be correctly spelled as -- Charles Fiterman --.

Signed and Sealed this

Twenty-sixth Day of July, 2005

JON W. DUDAS
*Director of the United States Patent and Trademark Office*